Aug. 14, 1951 D. R. COLE 2,564,394
METALLIC COILED SPRING WITH PROTECTIVE COVER
Filed April 9, 1949

Inventor: Dale R. Cole
By Oswald H. Milmore
His Attorney

Patented Aug. 14, 1951

2,564,394

UNITED STATES PATENT OFFICE 2,564,394

METALLIC COILED SPRING WITH PROTECTIVE COVER

Dale R. Cole, Centralia, Ill., assignor to Shell Development Company, San Francisco, Calif., a corporation of Delaware Application April 9, 1949, Serial No. 86,568

9 Claims. (Cl. 267—1)

This invention relates to metallic coiled springs protected by a flexible cover, which may be resilient, and has for its main object the provision of an improved combination of spring and cover which may be used to replace ordinary coiled springs and is capable of severe usage, such as exposure to fluids causing corrosion and erosion on the metal.

Valve springs in plunger and piston pumps are often subjected to severe usage, particularly when exposed to fluids containing abrasive solids, as, for example, slurries of mud and rocks formed in drilling wells, or various dispersions in chemical plants, or when such fluids are corrosive as, for example, salt waters or acids. Broken valve springs cause considerable damage to the valve seats and plungers whenever breakage occurs. Springs subjected to such severe usage deteriorate within a relatively short time. Steel, stainless steel, bronze and Monel metals have been used but these are not erosion resistant and frequently do not resist corrosion.

It has already been proposed to enclose the spring in a single flexible envelope. This has heretofore prevented installation of the enclosed spring as a replacement, necessitating special structure for supporting the spring and its envelope. Moreover, it was necessary to provide sufficient lateral space for the relatively great distension of the envelope as the axial distance was reduced, such lateral distension being caused by air or other fluid within the envelope; this distension, further, imposed strains on the envelope and limited its useful life.

Further objects of the invention are, therefore, to provide an improved protected coiled spring which has an axial bore and may be installed as a replacement for ordinary coiled springs with or without modifying the supporting or engaging structure; and to provide a protected spring wherein a relatively small volume is enclosed with the envelope, whereby the lateral distension of the protective envelope is reduced.

Still further objects will be apparent from the following description, taken together with the accompanying drawing forming a part of this specification and illustrating four specific embodiments of the invention by way of illustration. In the drawing.

Figure 1:
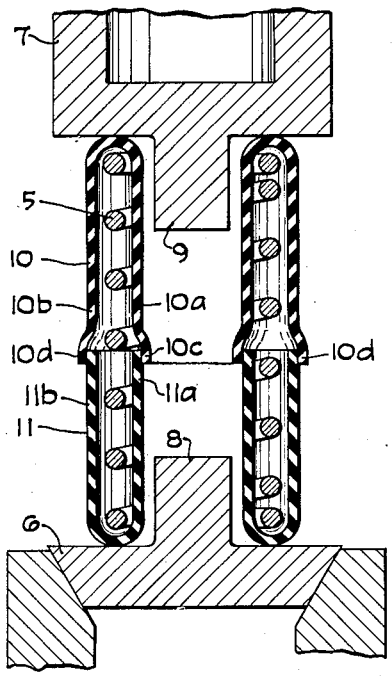
Fig. 1 is a sectional view of a first embodiment of the protected spring, installed to urge a valve toward its seat.

Briefly, according to the invention a coiled spring is completely enclosed in a flexible envelope having suitable resistant properties and providing a pair of substantially cylindrical walls, one wall on the outer side of the convolutions of the spring and the other wall on the inner side thereof, so as to form a central opening or bore through the envelope by which the spring may be engaged by any suitable supporting structure. The envelope may be formed of a single piece of flexible material, such as natural or synthetic rubber, like neoprene, plastic, or fabric impregnated with suitable synthetic rubber or thin metal, which may be corrugated or given a bellows-like structure; the envelope is suitably sealed to form a fluid-tight seal, e. g., by vulcanizing, bolting, clamping, or the like, or by heating, in the case of thermosetting plastics, after insertion of the metal spring. The envelope may be made of one piece, with an opening which is sealed after insertion of the coiled spring, or may be built of several sections. Various sealing means are illustrated in the drawings.

The envelope may be made of a size to enclose the coiled spring in its normal elongated position without axial distension of the envelope; in this arrangement the envelope may be made of any flexible material, such as impregnated fabric, regardless of its elastic properties. On the other hand, the envelope may be made somewhat shorter than the length of the spring, so that the envelope is stretched when the spring is fully expanded; in this case the envelope alters the characteristics of the spring and should be made of elastic material.

Referring to Fig. 1, there is shown at 5 a coiled metallic spring acting between a valve 6 and an abutment 7, and retained in position by valve guide studs 8 and 9. The spring is enclosed in a two-piece envelope consisting of upper and lower sections 10 and 11, respectively, made of rubber. Both sections provide inner cylindrical walls 10a and 11a, and outer cylindrical walls 10b and 11b, spaced apart only sufficiently to accommodate the spring 5. The upper section 10 is, further, provided with lips 10c and 10d which may be pre-shaped when forming the section to fit over the top of the lower section or may, if desired, be formed during assembly by slight deformation of the juxtaposed parts, taking advantage of the natural flexibility or resilience of the material. The lips 10c and 10d are vulcanized to the inner and outer walls 11a and 11b, respectively, to provide annular vulcanized bands, thereby sealing the space containing the spring against ingress of fluid.

Figure 2:
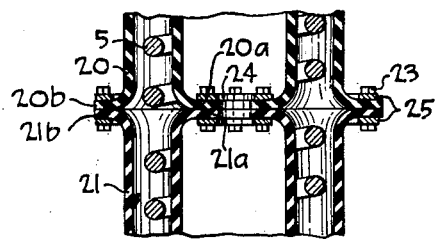
Fig. 2 is a fragmentary sectional view of a modified construction.

According to a modified sealing method, shown in Fig. 2, the envelope comprises upper and lower sections 20 and 21 having pre-shaped flanges 20a, 20b, 21a and 21b. These flanges abut each other along plane surfaces. After insertion of the spring into one of these sections the other section is placed over the projecting spring and the flanges are bolted together by means of bolts 23 the flanges being kept in engagement by metal rings 24 and 25. This construction is particularly adapted for large springs wherein relatively heavy envelopes are used. In lieu of the bolts, or in addition, the flanges may be vulcanized.

Figure 3:
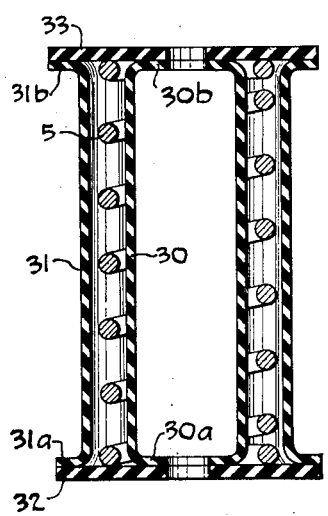
Figs. 3 and 4 are sectional views of protected springs showing two additional modifications of the envelope.

In the embodiment according to Fig. 3 the envelope is made of two separate cylindrical sheaths 30 and 31, having diameters to fit inside and outside of the spring, respectively. Both sheaths have flanges 30a, 30b, 31a and 31b at the ends, to which annular rubber or rubberized end closures 32 and 33 are secured by vulcanizing.

Figure 4:
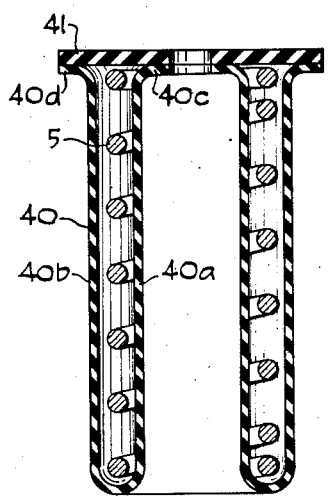

In the embodiment according to Fig. 4 the envelope is formed of a single, double walled member 40 providing inner cylindrical wall 40a and outer cylindrical wall 40b, each wall having a flange 40c or 40d at the top. An annular closure 41, constructed as described for end piece 33, is secured to the flanges by vulcanizing. It is evident that the closures 32, 33 and 41 may be connected to the flanges by bolts, in the manner shown in Fig. 2, instead of, or in addition to being vulcanized.

Figure 5:
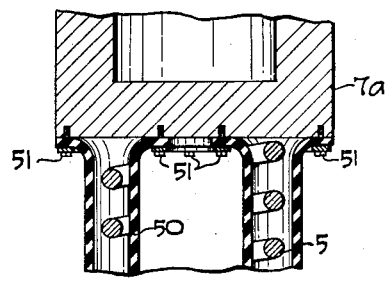
Fig. 5 is a fragmentary sectional view of a further modification wherein the envelope is bolted to an abutment.

The closures 32, 33, and 41 may be made of metal and connected to the flanges by bolts. In this case one or more of the closures may be fixed to, e. g., integral with the abutment member 6 or 7 of Fig. 1. Such a construction is shown in Fig. 5, wherein the top closure 7a is part of the abutment and is bolted to the double-walled flexible envelope 50 by means of bolts 51.

The envelopes according to the invention effectively protect the metal spring from deleterious action of gas or liquid in many different applications, such as when used on plunger and piston type pumps; in particular, they prevent electrolysis or corrosion of the spring, erosion of the spring and galvanic action. In certain cases, as when the envelope is made shorter than the spring they further vary the spring stress without changing the metallic material, and increase the tensional strength of the metallic spring to any desired extent. They are, further, effective to increase the combined resilience and shock damping effects of the spring.

I claim as my invention:

1. The combination of a coiled spring and a protective envelope of flexible material completely enclosing the spring, said envelope having two substantially cylindrical walls, one on the inside and the other on the outside of the convolutions of the spring, and leaving an open bore through said envelope.

2. The combination according to claim 1 wherein the envelope is made of a plurality of sections permanently secured together.

3. The combination according to claim 2 wherein the envelope is made of vulcanizable material and the sections are vulcanized to form a fluid-tight seal.

4. The combination according to claim 2 wherein the sections are secured by lips on the extremity of one section overlapping the end of the other section and sealed there to form a fluid-tight seal.

5. The combination according to claim 2 wherein the sections are provided with abutting flanges and the flanges are united to form a fluid-tight seal.

6. The combinaiton according to claim 5 wherein the flanges are united by bolts.

7. The combination according to claim 2 wherein the envelope comprises a section having inner and outer cylindrical walls extending substantially the entire length of the spring, said walls having flanges turned away from said walls near one end thereof, and another section comprises an annular closure in engagement with said flanges.

8. The combination according to claim 7 wherein the section having inner and outer cylindrical walls has an integrally formed bottom section for enclosing the spring at the end away from said annular closure.

9. The combination of a coiled spring and a protective envelope of flexible material containing rubber completely enclosing the spring, said envelope having two substantially cylindrical walls, one on the inside and the other on the outside of the convolutions of the spring, and leaving an open bore through said envelope.

DALE R. COLE.

REFERENCES CITED

The following references are of record in the file of this patent:

UNITED STATES PATENTS

| Number | Name | Date |
| --- | --- | --- |
| 38,642 | Vose | May 10, 1863 |
| 1,936,389 | Hallquist | Nov. 21, 1933 |
| 2,230,069 | Rushmore | Jan. 28, 1941 |